Patented Aug. 20, 1946

2,405,988

UNITED STATES PATENT OFFICE 2,405,988

ORGANO-SILICON ESTERS AND MATERIALS TREATED THEREWITH

Arthur J. Barry, Midland, Mich., assignor to The Dow Chemical Company, Midland, Mich., a corporation of Michigan No Drawing. Application December 10, 1943, Serial No. 513,746

6 Claims. (Cl. 260—462)

This invention concerns certain new organo-silicon esters of organic carboxylic acids, which esters contain, attached to the silicon atom, an alkyl or an alkoxy radical having at least 8 carbon atoms. It pertains especially to such esters having the general formula:

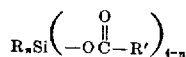

wherein R in each instance represents a radical selected from the class consisting of hydrocarbon and hydrocarbonoxy radicals and at least one R represents such radical containing at least 8 carbon atoms and selected from the class consisting of alkyl and alkoxy radicals, R' represents a hydrocarbon radical and $n$ is an integer not greater than 3. When in the above general formula $n$ is greater than 1, the radicals represented by the symbols R may be the same or different and, when $n$ is an integer less than 3, the radicals represented by the symbols R' may be the same or different. It also concerns the treatment of solid hydrophilic materials with such organo-silicon esters for purpose of modifying a surface of such normally hydrophilic material to render it repellent to water. The invention comprises the resultant water-repellent solid products.

The organo-silicon esters having the above general formula vary from mobile liquids to wax-like solids. They may be hydrolyzed with water to remove the ester radicals and form organo-silicols which often undergo intermolecular condensation reactions to form viscous liquid or solid products of high molecular weight; or they may be reacted with hydroxy compounds, e. g. alcohols, phenols, or cellulose, to form corresponding alkoxy-silicon derivatives of such hydroxy compounds. Accordingly, the new organo-silicon esters are useful as starting materials for the preparation of a variety of derivatives thereof.

The organo-silicon esters provided by the invention are especially useful as agents for the treatment of solid hydrophilic materials, particularly cellulosic materials, to modify the surface thereof and render such materials repellent to water. In my copending application Serial No. 513,745, filed concurrently herewith, it is disclosed that organo-silicon halides may be applied to and reacted with the hydroxyl groups at the surface of solid hydrophilic materials, e. g. metals, glass, wood, or cellulosic substances, to modify the surface of such normally hydrophilic materials and render them repellent to water. It is also pointed out that during such treatment a chemical reaction occurs with liberation of hydrogen halide and, apparently, with resultant chemical bonding of organo-silicon radicals to the hydrophilic material. The surface of the latter is thereby modified and is rendered repellent to water. However, in said copending application it is taught that the hydrogen halide formed in the treatment tends to act upon and weaken cellulosic materials and that in treating the latter with organo-silicon halides care should be taken to remove the hydrogen halide as soon as possible so as to limit the destructive action which takes place.

I have now found that the organo-silicon esters having the general formula hereinbefore mentioned may similarly be employed for the treatment of hydrophilic solid materials to modify the surface of the latter and render it repellent to water. In such treatment the organo-silicon esters apparently react chemically with hydroxyl groups at the surface of the hydrophilic material to liberate an organic carboxylic acid and chemically affix organo-silicon radicals to the hydrophilic base member. However, the invention is not limited to this theory as to the reason for the result which is obtained. The water-repellent film which is formed at the surface of the base member is very thin, and the appearance of the base member is usually not altered. The water-repellent film thus provided on a normally hydrophilic base member is absorptive to organic liquids. Paints, varnishes, lacquers, and the like usually adhere more firmly to such film than to the hydrophilic base member itself; hence, the latter may advantageously be provided with such film prior to being painted or varnished.

The organo-silicon esters may be applied to a variety of normally hydrophilic solid materials, e. g. iron and its alloys, magnesium and its alloys, other metals, wool, wood, cotton, or cellulose esters or ethers, etc., to modify surfaces of such materials and render them water-repellent. Apparently all such hydrophilic materials have reactive groups, usually hydroxyl and in some instances amino radicals, at the surface so that in all such treatments a chemical reaction may occur with resultant bonding of organo-silicon radicals to the surface of the hydrophilic material under treatment. That chemical bonding probably does take place is evidenced by the fact that the treated material does not readily lose its water-repellent properties when washed with solvents for the organo-silicon ester employed in the treatment.

The organo-silicon esters may be applied with particular advantage to cellulosic materials such as wood, cotton, cellulose acetate, or ethyl cellulose, etc., since the organic carboxylic acid which is liberated by the treatment has little or no detrimental action on cellulosic materials; hence, special precautions for rapidly removing the acid as it is formed are not required. For this reason, the organo-silicon esters of this invention are superior to organo-silicon halides as agents for treating cellulosic materials to render them water repellent.

The requirement that the organo-silicon esters contain on the silicon atom at least one alkyl or alkoxy radical having 8 or more carbon atoms is important, since I have found that the permanence and durability of the water-repellent film which is formed at the surface of a hydrophilic material when the latter is treated with such ester is largely dependent on the length of the largest alkyl or alkoxy radical attached to the silicon atom of the ester. For instance, a hydrophilic material such as cotton may be rendered water repellent by treatment with a lower organo-silicon compound such as triethyl-silicon acetate, triethoxy-silicon acetate, tripropoxy-silicon acetate, tri-isopropoxy-silicon acetate, tributoxy-silicon acetate, or dimethyl-silicon dichloride, etc., but the water-repellent film which is formed is readily removed by washing, particularly with soapy water. In contrast, the higher organo-silicon esters provided by the invention, when applied to cotton or other hydrophilic materials, form a far more permanent and durable water-repellent film which is not readily removed by washing. Furthermore, when, after prolonged use or extensive washing, the water-repellent film starts to fail, e. g. the hydrophilic base member becomes wetted in spots, the goods may again be rendered uniformly water repellent by drying and washing them with an organic solvent such as benzene, toluene, carbon tetrachloride, ethylene chloride, or propylene chloride, etc. It appears, therefore, that such ultimate failure of the water-repellent film formed by the higher organo-silicon esters of this invention is not due to destruction of the film but, more probably, to a change in the orientation of the organo-silicon groups at the surface of the hydrophilic base member and that the subsequent washing with an organic solvent causes a re-orientation of such groups so as to again render the treated material uniformly repellent to water. The invention is, of course, not restricted by this theory as to the reason for the results obtained. In general, the permanence and durability of the water-repellent films formed at the surface of hydrophilic base members increases with increase in the number of carbon atoms in the largest alkyl or alkoxy radical attached to the silicon atom of the organo-silicon ester used in forming such film and the organo-silicon esters containing such alkyl or alkoxy group having at least 12 carbon atoms are preferred for the purpose.

The organo-silicon esters may be prepared by the reaction of a salt of an organic carboxylic acid with a higher organo-silicon halide corresponding to the ester product desired. Methods for making organo-silicon halides are well known, but, since many of the higher organo-silicon halides used in preparing the esters are themselves new compounds, the general methods for making the halides will be mentioned briefly. Alkyl silicon halides, e. g. octyl-silicon trichloride or tri-dodecyl-silicon chloride, etc., may be prepared by reacting an alkyl magnesium halide, e. g. octyl-magnesium chloride or dodecyl-magnesium bromide with a silicon tetrahalide, e. g. silicon tetrachloride. Usually an ether is used as a medium for the reaction. The reactants are preferably employed in approximately the stoichiometric proportions, and the product is purified by distillation. Alkoxy silicon halides may be prepared by reacting an alcohol, e. g. octyl alcohol or dodecyl alcohol, with a polyhalo-silicon compound such as silicon tetrachloride, silicon tetrabromide, diethyl-silicon dichloride, or phenyl-silicon trichloride. Such reaction usually occurs readily at room temperature or below and may be carried out nearly quantitatively by heating the mixture, e. g. to 80–100° C., after the initial vigor of the reaction has subsided. The reactants are employed in proportions such as to replace at least one, but not all, of the halogen atoms of the polyhalo-silicon compound with alkoxy groups. For instance, tridodecoxy-silicon chloride may be prepared by reacting 3 molecular equivalents of dodecyl alcohol with one mole of silicon tetrachloride and di-dodecyl-dodecoxy-silicon chloride may be prepared by the reaction of equimolecular amounts of dodecyl alcohol and di-dodecyl-silicon dichloride. Usually, a solvent such as benzene, ligroin, or petroleum ether is used as a reaction medium and the mixture is cooled, e. g. to 10° C. or lower, in the early stages of the reaction.

The organo-silicon esters of this invention are preferably prepared by treating an organo-silicon halide, having on the silicon atom an alkyl or alkoxy group containing at least 8 carbon atoms, with a metal salt of an organic carboxylic acid and heating the mixture to a reaction temperature. Examples of organo-silicon halides which may be employed as reactants are octyl-silicon trichloride, decyl-silicon trichloride, di-octyl-silicon dichloride, tri-dodecyl chloride, di-myricyl-silicon dichloride, octyloxy-silicon trichloride, di-octyloxy-silicon dichloride, tri-octyloxy-silicon chloride, dodecoxy-silicon trichloride, phenyl-octyl-dodecoxy-silicon chloride, di-dodecyl-dodecoxy-silicon chloride, dodecyl-myricyloxy-silicon dichloride, etc. In place of the chlorides the corresponding organo-silicon bromides may be used. Among the various salts of organic carboxylic acids which may be used as reactants are sodium formate, potassium acetate, sodium propionate, potassium butyrate, sodium valerate, sodium crotonate, sodium oleate, sodium stearate, sodium benzoate, or sodium cinnamate, etc. Salts of polycarboxylic acids may similarly be used to form neutral organo-silicon esters thereof. The salt is employed in amount at least as great as that theoretically required to displace the halogen atoms of the organo-silicon halide reactant and it preferably is used in excess. Usually, two chemical equivalent weights or more of the salt is used per atomic weight of halogen in the organo-silicon halide reactant. In place of the salts of the carboxylic acids, the free acids may, though somewhat less conveniently, be used as reactants. One part by volume or more of an inert organic solvent such as petroleum ether, ligroin, benzene, or toluene, etc., is preferably employed, per part of the organo-silicon halide, as a medium for the reaction, but the reaction may be carried out in the absence of such medium.

The mixture is heated under reflux, or in a closed container, to a reaction temperature, usually of from 60° to 120° C., for a time sufficient for completion of the reaction. Reaction temperatures below or above those just mentioned may be used. The reaction is usually complete after from 10 to 20 hours of heating at about 100° C. The product is then separated from the sodium chloride, or other inorganic halide, formed in the reaction by usual procedure, e. g. filtration or extraction of the product from the reaction mixture with an organic solvent such as petroleum ether or ligroin followed by vaporization of the solvent from the product. By such procedure, a neutral organo-silicon ester may be obtained in a concentrated, or substantially pure, form. In some instances, the product may be further purified by fractional distillation under vacuum, but many of the organo-silicon esters of the present invention are high-boiling compounds which tend to undergo decomposition when fractionally distilled.

The following examples describe a number of ways in which the principle of the invention has been applied, but are not to be construed as limiting the invention:

EXAMPLE 1

In each of a series of experiments, a higher organo-silicon ester was prepared by heating a mixture of a sodium salt of an organic carboxylic acid and a solution of an organo-silicon chloride in an equal volume or more, usually about 1.5 parts by volume, of petroleum ether, or toluene, under reflux at about 100° C. until the formation and precipitation of sodium chloride was no longer observed. In most instances, 16 hours of heating at said temperature was sufficient. The mixture was then filtered to remove the sodium chloride formed in the reaction, after which the solvent was distilled from the filtrate to obtain the organo-silicon ester product as the residue. In some instances a further quantity of the solvent was added prior to the filtration in order to dissolve the ester product, but usually the quantity of solvent employed as the reaction medium was sufficient to maintain the product in solution. Many of the organo-silicon ester products thus obtained were further purified by fractional distillation, but some of the products were of too high boiling point to permit distillation without the occurrence of decomposition. In all instances, the products were obtained in a highly concentrated form satisfactory for use in the treatment of fabrics or other solid hydrophilic materials to render such materials repellent to water. The following table names the reactants employed in preparing each organo-silicon ester product, states the molecular proportions in which they were used, describes the ester product, and states whether the product is distilled. Since many of the organo-silicon halides employed in preparing the ester products are themselves new compounds, the table includes a statement as to the kinds and proportions of reactants used in making such halides. The procedures for making the organo-silicon halides have been presented in the foregoing general description of the invention.

*Table I*

| Run No. | Reactants | | | | | | Organo-silicon ester product | | Product distilled |
|---|---|---|---|---|---|---|---|---|---|
| | Organo-silicon halide | | | | Salt | | | | |
| | Kind | Moles | Prepared from— | | Kind | Moles | Name | Description | |
| | | | Compound | Moles | | | | | |
| 1 | Tridodecoxy silicon chloride. | 1 | SiCl$_4$ / Dodecyl alcohol | 1 / 3 | Sodium formate | 3 | Tridodecoxy silicon formate. | Liquid of pale tan color. | No. |
| 2 | ...do... | 1 | SiCl$_4$ / Dodecyl alcohol | 1 / 3 | Sodium acetate | 4 | Triododecoxy silicon acetate. | Liquid of pale lemon color; M.P. about 5.5° C.; distilling temp. 278–310° C./1.5 mm. with decomposition. | Yes. |
| 3 | Tri-octadecoxy silicon chloride. | 1 | SiCl$_4$ / Octadecyl alcohol | 1 / 3 | ...do... | 4 | Tri-octadecoxy silicon acetate. | A white wax of M. P. 41.3° C. | No. |
| 4 | Di-octadecoxy-propoxy-silicon chloride. | 1 | SiCl$_4$ / Octadecyl alcohol / n-Propyl alcohol | 1 / 2 / 1 | ...do... | 4 | Di-octadecoxy-propoxy-silicon acetate. | A soft wax of yellowish color. | No. |
| 5 | Octadecoxy-dodecoxy-propoxy-silicon chloride. | 1 | SiCl$_4$ / Octadecyl alcohol / Dodecyl alcohol / n-Propyl alcohol | 1 / 1 / 1 / 1 | ...do... | 4 | Octadecoxy-dodecoxy-propoxy-silicon acetate. | A yellow liquid. | No. |
| 6 | Di-dodecoxy silicon dichloride. | 1 | SiCl$_4$ / Di-dodecyl alcohol | 1 / 2 | ...do... | 8 | Di-dodecoxy silicon diacetate.[1] | Nearly colorless liquid (light tan). | No. |
| 7 | Dodecoxy silicon trichloride. | 1 | SiCl$_4$ / Dodecyl alcohol | 1 / 1 | ...do... | 10.7 | Dodecoxy silicon tri-acetate.[1] | A nearly colorless liquid. | No. |
| 8 | Tri-myricyloxy silicon chloride. | 1 | SiCl$_4$ / Myricyl alcohol | 1 / 3 | ...do... | 4 | Trimyriciloxy silicon acetate. | A white wax-like solid. | No. |
| 9 | Tri-octyloxy silicon chloride. | 1 | SiCl$_4$ / Octanol-2 | 1 / 3 | ...do... | 4 | Tri-octyloxy silicon acetate. | A liquid of light amber color. | No, 96 hr. reaction period. |
| 10 | Di-dodecoxy-iso-amyl silicon chloride. | 1 | Iso-amyl silicon trichloride / Dodecyl alcohol | 1 / 2 | ...do... | 3 | Di-dodecoxy-iso-amyl silicon acetate. | A liquid of brown color. | No. |
| 11 | Dodecoxy-di-phenyl silicon chloride. | 1 | Di-phenyl silicon dichloride / Dodecyl alcohol | 1 / 1 | ...do... | 3 | Dodecoxy-di-phenyl silicon acetate. | A nearly colorless liquid. | No. |
| 12 | Tri-dodecyl silicon chloride. | 1 | SiCl$_4$ / Dodecyl magnesium chloride. | 1 / 3 | ...do... | 3 | Tri-dodecyl silicon acetate. | A liquid of pale yellow color. | No. |
| 13 | Dodecyl silicon trichloride. | 1 | SiCl$_4$ / Dodecyl magnesium chloride. | 1 / 1 | ...do... | 6 | A mixture of dodecyl silicon tri-acetate and C$_{12}$H$_{25}$SiO$_2$CCH$_3$. | ...do... | No. |
| 14 | Dodecyl diphenyl silicon dichloride. | 1 | Di-phenyl silicon dichloride / Dodecyl magnesium chloride. | 2.5 / 1 | ...do... | 2 | Dodecyl di-phenyl silicon acetate (C. F. D-5560). | A liquid of light tan color. | No. |
| 15 | Dodecoxy-di-octyloxy silicon chloride. | 1 | Dodecoxy silicon trichloride / Sec-octyl alcohol | 1 / 2 | Sodium stearate | 1 | Dodecoxy di-octyloxy silicon stearate. | A liquid of tan color. | No. |

[1] Products believed to contain compounds formed by loss of one or more acetate radicals.

EXAMPLE 2

In each of a series of experiments, a strip of cotton broadcloth, having a count of 80 x 160 threads per inch, was immersed for 10 minutes in a solution containing 3 per cent by weight of the organo-silicon ester named in Table II dissolved in a dry-cleaning liquid consisting of a mixture of ethylene chloride and propylene chloride. The cloth was then pressed with a flatiron heated to about 250° C. until substantially free of the dry-cleaning fluid and thereafter for about two minutes to assure reaction of the organo-silicon ester on the fabric. Different strips of the treated cloth were subjected to different kinds of washing operations, after which each was dried, i. e. until substantially free of the wash liquor, and tested for water repellency by the "hydrostatic" method described by Slowinske in Am. Dyestuff Reporter 30 7 (1941). The kinds of washing operations employed in the different experiments are named in the table and are as follows: (1) a hand wash with water which contained 0.5 per cent by weight of soap (the hand soap marketed as Palmolive was used) and (2) subjecting the treated material to extraction for 18 hours in a Sohxlet extractor using the above-mentioned dry-cleaning fluid, i. e. a mixture of ethylene chloride and propylene chloride, as the extractant. The purpose of the treatment with the dry-cleaning fluid was to find whether said fluid, which is an excellent solvent for the organo-silicon esters applied to the pieces of fabric, would extract from the latter the ingredient causing it to be repellent to water. Failure of the dry-cleaning fluid to destroy the water-repellent property of a fabric would be evidence that the organo-silicon ester had reacted chemically with the fabric. The table states the repellency toward water of each treated fabric in terms of the hydrostatic pressure in centimeters of water which the fabric withstood before leakage occurred during the test of the fabric by the above-mentioned hydrostatic method.

Table II

| Run No. | Organo-silicon ester | $H_2O$ repellency of treated fabric after— | | |
|---|---|---|---|---|
| | | No washing | Washing with soapy water | Extraction with dry-cleaning fluid |
| 1 | Tri-octyloxy-silicon acetate | 11 | Not tested | 20 |
| 2 | Dodecyloxy-silicon tri-acetate | 18 | 14 | 35 |
| 3 | Di-dodecyloxy-silicon di-acetate | 19 | 15 | 34 |
| 4 | Tri-dodecoxy-silicon acetate | 19 | 11 | 34 |
| 5 | Dodecoxy-di-phenyl-silicon acetate | 16 | Not tested | 24 |
| 6 | Tri-octadecyloxy-silicon acetate | 23 | 20 | 32 |
| 7 | Dodecyl-di-phenyl-silicon acetate | 23 | Not tested | 34 |
| 8 | Tri-dodecyl-silicon acetate | 32 | do | 38 |

From a comparison of Run 4 of Table II with Run 8 and of Run 5 with Run 7, it will be noted that the water-repellent films formed on fabrics by treating the latter with higher alkyl silicon esters are somewhat more effective and more stable against the action of soapy water than are the films formed by treating fabrics with corresponding alkoxy-silicon esters.

EXAMPLE 3

A number of strips of cotton broadcloth, having a count of 80 x 160 threads per inch, were treated with dodecyl-di-phenyl silicon acetate, or with tri-dodecyl silicon acetate, and the treated fabrics were pressed with a heated flatiron, as in Example 2. However, the different pieces of treated fabric were then subjected to washing procedures which were even more severe than those employed in Example 2. One of the washing procedures was the standard soap and water washing operation described on page 170 of the AATCC book of "Standard Test Methods." Another procedure involved subjection of a fabric to extraction for approximately 18 hours in a Sohxlet extractor while using the dry-cleaning fluid mentioned in Example 2 as the extractant and then freeing the fabric of the dry-cleaning fluid and subjecting it to said standard washing operation with soap and water. A third procedure involved extracting a fabric with the dry-cleaning fluid and then subjecting it to the standard washing operation with soap and water, as just described, and next again subjecting it to extraction with the dry-cleaning fluid for a period of about 18 hours in a Sohxlet extractor. A treated fabric, after being washed by one of these three procedures, was dried and tested for water repellency by the "hydrostatic" method mentioned in Example 2. Table III names the alkyl silicon esters used for the treatment of fabrics in the different experiments and gives the water repellency of the treated fabrics after being subjected to the respective washing procedures just described. The water repellency is expressed in terms of the hydrostatic pressure, in centimeters of water, which the fabric withstood before leakage occurred.

Table III

| Run No. | Organo-silicon ester | $H_2O$ repellency of treated fabric after— | | |
|---|---|---|---|---|
| | | Std. soap and water wash | Dry-cleaning followed by std. soap and water wash | Successive dry-cleaning; std. soap and water wash; dry-cleaning |
| 1 | Dodecyl-di-phenyl-silicon acetate | 14 | 10 | 16 |
| 2 | Tri-dodecyl-silicon acetate | 19 | 10 | 30 |

From the above data it appears that the dry-cleaning fluid has the effect of orienting the organo-silicon radicals at the surfaces of the fabric so as to increase the repellency toward water.

Other modes of applying the principle of the invention may be employed instead of those explained, change being made as regards the step or steps herein disclosed provided the step or steps set forth by any of the following claims or the equivalent of such stated step or steps be employed.

I therefore particularly point out and distinctly claim as my invention:

1. An organo-silicon ester having the general formula:

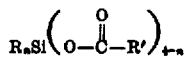

wherein R in each instance represents a radical selected from the class consisting of hydrocarbon and hydrocarbonoxy radicals and at least one R represents such radical containing at least 8 carbon atoms and selected from the class consisting of alkyl and alkoxy radicals, R' represents a hydrocarbon radical, and $n$ is an integer not greater than 3.

2. An organo-silicon ester having the general formula:

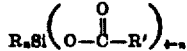

wherein R in each instance represents an alkoxy radical containing at least 8 carbon atoms, R' represents an alkyl radical, and $n$ is an integer not greater than 3.

3. Tri-octadecyloxy-silicon acetate.

4. An organo-silicon ester having the general formula:

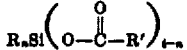

wherein R is an alkyl radical having at least 8 carbon atoms, R' represents an alkyl radical and $n$ is an integer not greater than 3.

5. Dodecyl-di-phenyl-silicon acetate.

6. Tri-dodecyl-silicon acetate.

ARTHUR J. BARRY.

Disclaimer 2,405,988.—*Arthur J. Barry*, Midland, Mich. ORGANO-SILICON ESTERS AND MATERIALS TREATED THEREWITH. Patent dated Aug. 20, 1946. Disclaimer filed June 20, 1951, by the assignee, *The Dow Chemical Company*.

Hereby enters this disclaimer from the scope of said patent: In claim 1, esters of the formula given wherein the symbol R represents an alkyl radical; claim 4 in its entirety.

[*Official Gazette July 31, 1951.*]

plained, change being made as regards the step or steps herein disclosed provided the step or steps set forth by any of the following claims or the equivalent of such stated step or steps be employed.

I therefore particularly point out and distinctly claim as my invention:

1. An organo-silicon ester having the general formula:

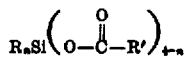

wherein R in each instance represents a radical selected from the class consisting of hydrocarbon and hydrocarbonoxy radicals and at least one R represents such radical containing at least 8 carbon atoms and selected from the class consisting of alkyl and alkoxy radicals, R' represents a hydrocarbon radical, and $n$ is an integer not greater than 3.

2. An organo-silicon ester having the general formula:

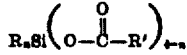

wherein R in each instance represents an alkoxy radical containing at least 8 carbon atoms, R' represents an alkyl radical, and $n$ is an integer not greater than 3.

3. Tri-octadecyloxy-silicon acetate.

4. An organo-silicon ester having the general formula:

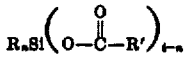

wherein R is an alkyl radical having at least 8 carbon atoms, R' represents an alkyl radical and $n$ is an integer not greater than 3.

5. Dodecyl-di-phenyl-silicon acetate.

6. Tri-dodecyl-silicon acetate.

ARTHUR J. BARRY.

Disclaimer 2,405,988.—*Arthur J. Barry*, Midland, Mich. ORGANO-SILICON ESTERS AND MATERIALS TREATED THEREWITH. Patent dated Aug. 20, 1946. Disclaimer filed June 20, 1951, by the assignee, *The Dow Chemical Company*.

Hereby enters this disclaimer from the scope of said patent: In claim 1, esters of the formula given wherein the symbol R represents an alkyl radical; claim 4 in its entirety.

[*Official Gazette July 31, 1951.*]